United States Patent
Lang et al.

(10) Patent No.: US 7,025,486 B2
(45) Date of Patent: Apr. 11, 2006

(54) OUTSIDE MIRROR WITH BLINKER LIGHT FOR VEHICLES

(75) Inventors: Heinrich Lang, Ergersheim (DE); Wolfgang Seiboth, Bad Windsheim (DE); Georg Hecht, Weihenzell (DE)

(73) Assignee: Lang-Mekra North America, LLC, Ridgeway, SC (US)

( * ) Notice: Subject to any disclaimer, the term of this patent is extended or adjusted under 35 U.S.C. 154(b) by 69 days.

(21) Appl. No.: 10/408,386

(22) Filed: Apr. 7, 2003

(65) Prior Publication Data
US 2004/0004841 A1   Jan. 8, 2004

(30) Foreign Application Priority Data
Apr. 10, 2002   (DE) ................. 102 15 854

(51) Int. Cl.
*B60Q 1/00*   (2006.01)
*B60Q 3/00*   (2006.01)
*F21V 11/00*  (2006.01)
*F21V 15/01*  (2006.01)

(52) U.S. Cl. ............ 362/546; 362/545; 362/248; 362/494; 362/520; 362/224; 362/240; 362/244; 362/311; 362/326; 362/337; 362/800

(58) Field of Classification Search ............... 362/546, 362/545, 248, 494, 509, 510, 511, 520, 223, 362/224, 240, 244, 311, 326, 337, 800; 359/838–884
See application file for complete search history.

(56) References Cited

U.S. PATENT DOCUMENTS

| 584,761 A | 6/1897 | Eaton |
| 809,698 A | 1/1906 | Kelley |
| 1,304,370 A * | 5/1919 | Ray ........................... 362/494 |
| 2,060,401 A | 11/1936 | Smith |
| 2,263,382 A | 11/1941 | Gotzinger |
| 2,511,971 A | 6/1950 | Dalton |
| 2,561,582 A | 7/1951 | Marbel |
| 2,580,014 A | 12/1951 | Gazda |
| 2,595,331 A | 5/1952 | Calihan et al. |
| 3,040,207 A | 6/1962 | Grontkowski |
| 3,266,016 A | 8/1966 | Maruyama et al. |
| 3,317,906 A | 5/1967 | Baldridge |
| 3,574,283 A | 4/1971 | Albers |
| 3,665,392 A | 5/1972 | Annas |
| 3,703,636 A * | 11/1972 | Schmitt ........................ 362/298 |
| 3,840,851 A | 10/1974 | Fowler et al. |
| 3,948,660 A | 4/1976 | Deml et al. |
| 4,040,726 A | 8/1977 | Paca |

(Continued)

FOREIGN PATENT DOCUMENTS

DE           29804489 U1     7/1998

(Continued)

OTHER PUBLICATIONS

German Search Report dated Apr. 4, 2003, and English-language translation.

(Continued)

*Primary Examiner*—Sandra O'Shea
*Assistant Examiner*—Sharon Payne
(74) *Attorney, Agent, or Firm*—McNair Law Firm, P.A.

(57) ABSTRACT

A light assembly for a vehicle mirror is provided. The light assembly in one aspect has a light directing arrangement attached to a transparent pane, which directs a light beam into a specified zone, controls a color of the light beam and controls an intensity of the light. In another aspect, a pane is provided having similar attributes and a water drain and drip edge.

14 Claims, 3 Drawing Sheets

U.S. PATENT DOCUMENTS

| | | | |
|---|---|---|---|
| 4,274,078 A | 6/1981 | Isobe et al. | |
| 4,443,057 A | 4/1984 | Bauer et al. | |
| 4,463,411 A | 7/1984 | Proctor | |
| 4,475,100 A | 10/1984 | Duh | |
| 4,516,197 A | 5/1985 | Yonkers | |
| 4,583,155 A | 4/1986 | Hart | |
| 4,591,954 A | 5/1986 | Kawamura et al. | |
| 4,603,946 A | 8/1986 | Kato et al. | |
| 4,613,791 A | 9/1986 | Kurihara et al. | |
| 4,623,222 A | 11/1986 | Itoh et al. | |
| 4,701,022 A | 10/1987 | Jacob | |
| 4,791,534 A * | 12/1988 | Lindberg | 362/516 |
| 4,799,768 A | 1/1989 | Gahan | |
| 4,878,743 A | 11/1989 | Aikawa et al. | |
| 5,014,167 A | 5/1991 | Roberts | |
| 5,029,060 A | 7/1991 | Aho et al. | |
| 5,059,015 A | 10/1991 | Tran | |
| 5,072,340 A | 12/1991 | Jones | |
| 5,101,193 A * | 3/1992 | Smith et al. | 340/479 |
| 5,150,966 A | 9/1992 | Nelson | |
| H1109 H | 10/1992 | Roberts et al. | |
| 5,165,772 A | 11/1992 | Wu | |
| 5,174,649 A | 12/1992 | Alston | |
| 5,179,471 A | 1/1993 | Caskey et al. | |
| 5,241,457 A * | 8/1993 | Sasajima et al. | 362/503 |
| 5,300,487 A | 4/1994 | Hed | |
| 5,355,284 A | 10/1994 | Roberts | |
| 5,361,190 A | 11/1994 | Roberts et al. | |
| 5,388,035 A | 2/1995 | Bodem, Jr. | |
| 5,404,869 A | 4/1995 | Parkyn, Jr. et al. | |
| 5,436,741 A | 7/1995 | Crandall | |
| 5,495,227 A * | 2/1996 | Wreede et al. | 340/479 |
| 5,497,306 A * | 3/1996 | Pastrick | 362/494 |
| 5,528,422 A | 6/1996 | Roberts | |
| 5,587,699 A | 12/1996 | Faloon et al. | |
| 5,644,443 A * | 7/1997 | Hung | 359/856 |
| 5,659,423 A | 8/1997 | Schierbeek et al. | |
| 5,691,849 A | 11/1997 | Ledroit et al. | |
| D394,833 S | 6/1998 | Muth | |
| 5,788,357 A | 8/1998 | Muth et al. | |
| D409,540 S | 5/1999 | Muth | |
| 6,045,243 A | 4/2000 | Muth et al. | |
| 6,264,353 B1 | 7/2001 | Caraher et al. | |
| 6,290,378 B1 | 9/2001 | Buchalla et al. | |
| 6,550,943 B1 * | 4/2003 | Strazzanti | 362/464 |

FOREIGN PATENT DOCUMENTS

| | | |
|---|---|---|
| DE | 19808139 A1 | 9/1999 |
| DE | 69509784 T2 | 10/1999 |
| DE | 19959609 A1 | 12/1999 |
| DE | 198 33 299 C1 | 3/2000 |
| DE | 20011341 U1 | 10/2000 |
| DE | 699 24 281 T2 | 4/2005 |
| EP | 1172257 A2 | 1/2002 |

OTHER PUBLICATIONS

English-language abstract for DE 19808139 from esp@cenet.com.

English-language abstract for DE 19959609 from esp@cenet.com.

* cited by examiner

OUTSIDE MIRROR WITH BLINKER LIGHT FOR VEHICLES

FIELD OF THE INVENTION

The present invention concerns a blinker light installed in an outside mirror, especially for use in commercial vehicles.

BACKGROUND OF THE INVENTION

Motor vehicles have lights generally in their forward and rear areas. By varying optical signals from the lights such as color, frequency, brightness, and the like, the lights serve to indicate lane changes or announce an emergency situation (warning lights) for the vehicle.

In the interests of improving traffic safety, EP 1 172 257 A2 discloses additional blinker lights to be provided on outside mirrors of motor vehicles.

DE 198 08 139 proposes, in this respect, the use of fluorescent tubes. These blinker lights must, most importantly, be observable by following traffic, so that, the intention of a change in direction can be detected promptly. At the same time, the blinker lights themselves must not dazzle or irritate the driver.

DE 199 59 609 A1, in this matter, describes the placement of at least one LED on a back side of an outside mirror housing, in such a manner that the LED light is emitted in exactly directed beams and thus, because of aimed alignment of the LED, the driver is not dazzled upon looking in the mirror.

However, it is difficult with a known apparatus to attain the legal intensity of illumination for commercial vehicles, which is clearly higher than that of the standards for personal passenger motor vehicles. In Germany, for example, such auxiliary blinking lights must comply with Category 6 ECE.

A sufficiently intense illumination is desirable in the mirror housing that is not in the direct line of sight of a driver, but rather is visible to an observer in a position behind the vehicle such that the emitted light is deflected rearward by an appropriately shaped light conductor.

In this matter, first, an appropriate light conductor is necessary. Second, because of scattering losses and the like in the light conductor, the source of light must be of a greater intensity than the optionally desired intensity of emission, which leads to higher heating, a greater consumption of energy, and a more expensive means of light generation. Moreover, dazzling and irritation of the driver is possible from the light conductor due to emergence dispersion, etc.

BRIEF SUMMARY OF THE INVENTION

The present invention provides a blinker light in an outside mirror, which possesses sufficient intensity and at the same time avoids dazzling either the driver or a possible passenger. For example, the invention permits the light to travel essentially in one specified angular zone away from its source, so that a dazzling of the driver is prevented. At the same time losses through light conductors or the like are avoided.

In a first embodiment of the present invention, light is directed by vertical, opaque strips, offset from one another on the inside and outside of a transparent pane. In this way, only those light beams from the light source, which exist in the direction of the specified angle areas, are radiated from the blinker light. Stray beams of light, which could, to a certain extent, dazzle the driver, are absorbed by the offset strips, or may be advantageously reflected back one or more times in such a manner that they finally coincide with the emission within the specified angle area.

In a second embodiment of the present invention, light is directed by one or more transparent areas having horizontal cross-sections which permit light beams to pass through to a predetermined angular zone. Advantageously, the transparent areas have more or less the same angular zone as is specified.

In a third embodiment of the present invention, light is directed by prismatically designed partial areas of a glass plate. In this arrangement, advantageously, such a prismatic partial area has a vertical cross-section in the shape of a triangle, the first leg of which (preferably the hypotenuse) faces the source of light, the second leg thereof (preferably the longer leg) is set normal to the bisector of the angle of the specified angular zone, and the third leg of the triangle lies normal to a principal direction of dazzling, into which direction as few light beams as possible are allowed to shine.

In an advantageous modification, this third leg is made opaque. In this way, essentially only beams of light are radiated in the predetermined angular zone.

BRIEF DESCRIPTION OF THE DRAWINGS

Further features, advantages and embodiments become evident from the detailed description below in combination with the drawings in which.

DETAILED DESCRIPTION OF THE DRAWINGS

Figure 1:
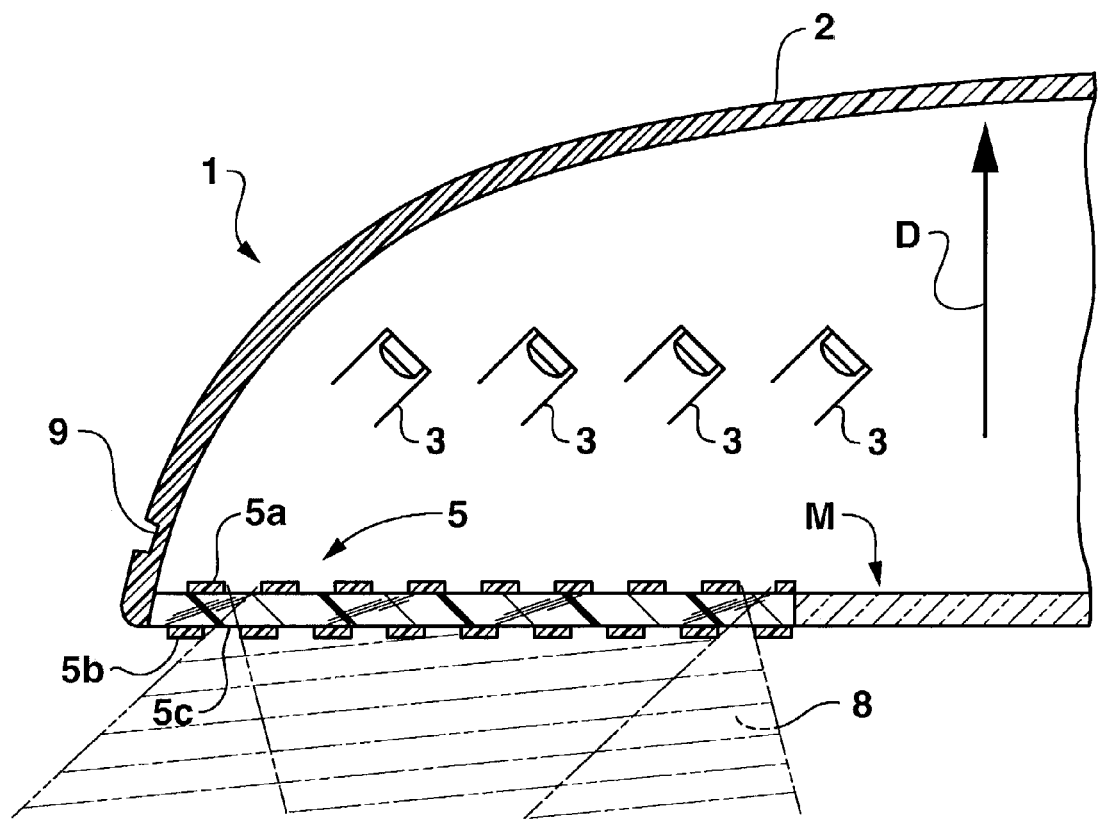
FIG. 1 is a blinker light in accord with a first embodiment of the present invention, presented in a horizontal cross-section.

Detailed reference will now be made to the drawings in which examples embodying the present invention are shown. The drawings and detailed description provide a full and detailed written description of the invention, and of the manner and process of making and using it, so as to enable one skilled in the pertinent art to make and use it, as well as the best mode of carrying out the invention. However, the examples set forth in the drawings and detailed description are provided by way of explanation of the invention and are not meant as limitations of the invention. The present invention thus includes any modifications and variations of the following examples as come within the scope of the appended claims and their equivalents.

The detailed description uses numerical and letter designations to refer to features in the drawings. Like or similar designations in the drawings and description have been used to refer to like or similar parts of the invention.

FIG. 1 shows an invented blinker light 1 in accord with a first embodiment of the present invention with a housing 2 and sources of light 3 placed therein. These sources of light 3 consist of, respectively, a light source of the nature of an LED, or a fluorescent tube, an incandescent bulb, or the like, with a reflector, which is so aligned, that the light radiated from the source of light is essentially oriented in the direction of a specified angular zone 8.

The angular zone 8, in this embodiment is so specified that, first, the light, i.e., the blinker signal, is readily recognized from the outside, in particular by an observer behind the vehicle. Second, the driver, and if present a passenger, is neither dazzled nor irritated thereby.

At this point, it is well to note that for the sake of simplicity, instead of bringing a passenger side mirror into explanation and description, the invention can be applied fully analogously in the case of a passenger side outside mirror.

The light radiated from the source of light 3 passes outward through a transparent pane 4 proximate a mirror M and the housing 2. As this occurs, only light of a defined range of wave length is enabled to penetrate the pane, so that the light signal acquires a predetermined color, for example, orange.

The light directional means 5 encompasses opaque, parallel, vertical strips 5a, 5b, etc. situated both on the inner and outer sides of the glass pane 4. The strips 5a, 5b, etc. are offset from one another. Only light beams within the given angular zone 8 can penetrate through both the inner and the outer strips 5a, 5b without hindrance. This is due to the fact that other directed beams of light are either absorbed, or alternatively, are reflected back in the direction of the sources of light 3. Such doubly reflected light beams, being directed back to the sources of light, can be reflected again to other strips 5a, 5b and/or from the inside of the housing 2 and emanate through openings 5c in the direction of the predetermined angular zone 8. In this way, the yield or intensity of light is advantageously increased. Notably, the opaque strips 5a, 5b, etc. can be imprinted on the glass pane 4.

Figure 2:
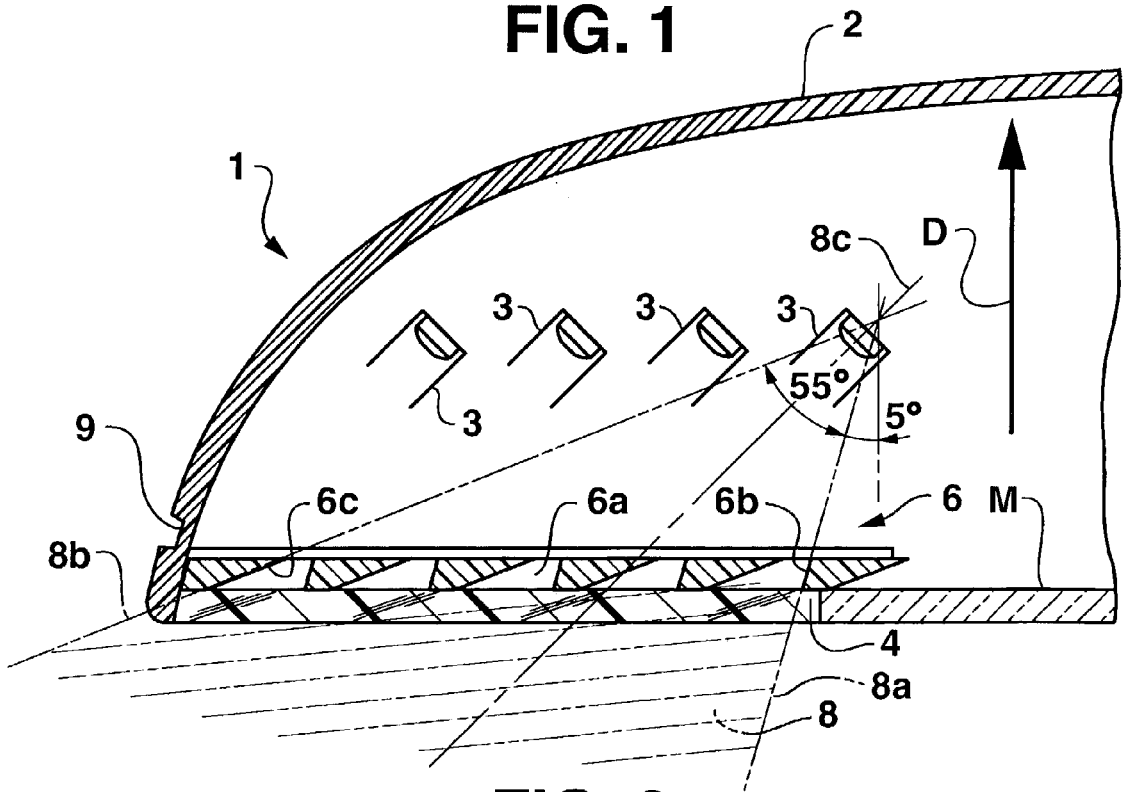
FIG. 2 is a blinker light in accord with a second embodiment of the present invention, presented in horizontal cross-section.

FIG. 2 shows an invented blinker light 1 in accord with a second embodiment of the present invention. In this mode of construction, light is generally directed by a light directing arrangement 6 having a non-transparent area that exhibits several transparent openings 6a. The horizontal cross-section of these transparencies 6a are so designed that only light beams within a specified angular zone 8 can penetrate therethrough. In one aspect, the inner sides 6b, 6c of the vertical extremities of the transparent light openings 6a, are essentially parallel to respective edges 8a, 8b of the specified angular zone 8.

In this case, the specified angular zone 8 has an angle zone of 5° to 60° measured in a mathematically positive manner relative to a direction of travel D as shown in FIG. 2. In the example shown here, the principal direction of the light source 3 corresponds to an angle bisector 8c of this angular zone 8 from which an especially advantageous usage of the light source 3 is gained.

In the embodiment shown in FIG. 2, the light direction arrangement 6 is placed separately and in front of the pane 4. Alternatively, the light direction arrangement 6 can be integrated into the pane 4, somewhat by the coloration of appropriate areas or by the use of a multipiece pane composed of corresponding opaque and transparent parts.

Figure 3:
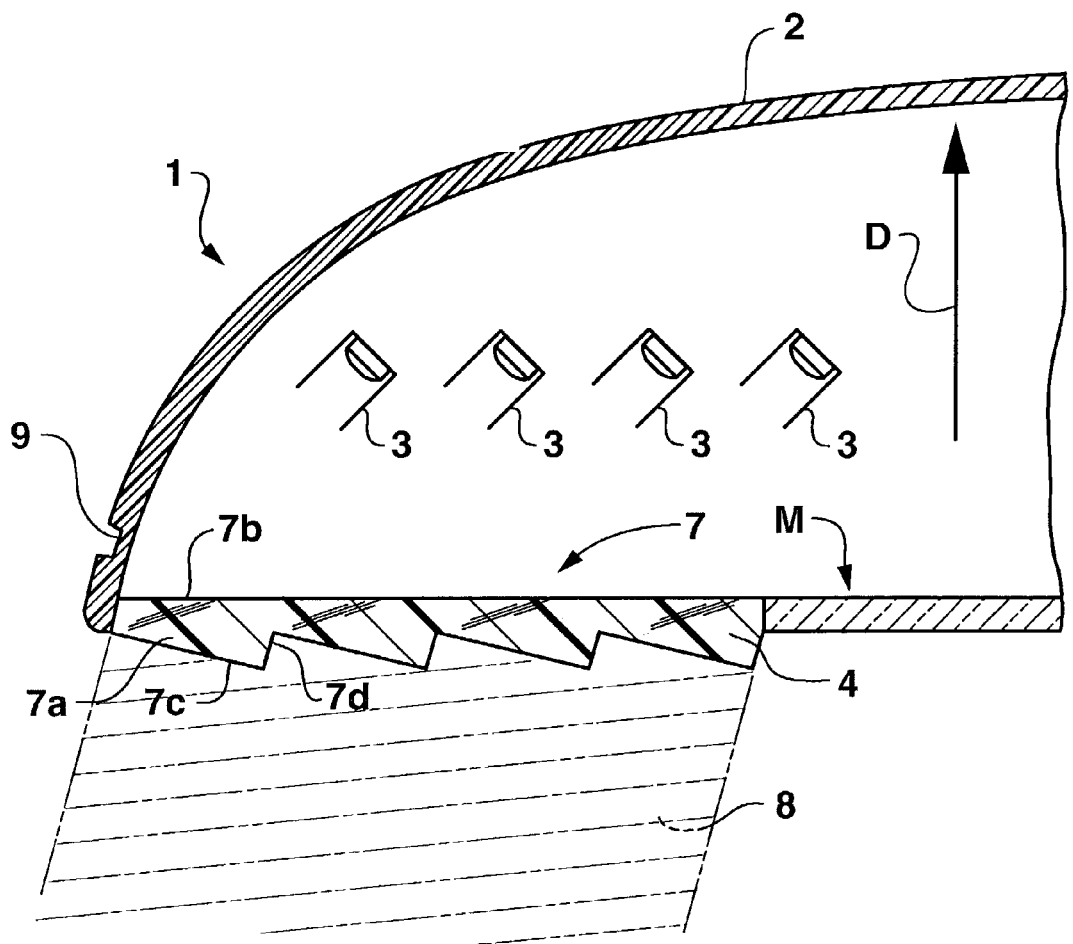
FIG. 3 is a blinker light in accord with a third embodiment of the present invention, presented in horizontal cross-section.

FIG. 3 shows an invented blinker light 1 in accord with a third embodiment of the present invention. In this embodiment, the light directional arrangement 7 is constructed of a plurality of prismatic units 7a, which are designed to be in the pane 4. A first side 7b of each prismatic unit 7a faces the light source 3. A second side 7c, is placed normal to the desired direction of beam radiation, which is also the bisector of the given angular zone 8. A third side 7d is placed normal to the second side 7c. Light beams, which essentially are already in the desired radiation direction, penetrate through the first side 7b of the prismatic unit 7a, continue unhindered through the second side 7c and so comply with the requirements of desired light signal within the specified angular zone 8. On the other hand, light beams that emanate in an undesirable direction, that is, a direction which would dazzle the driver, enter through the first side 7b of the prismatic unit 7a and proceed to the third side 7d, which is preferably opaque. The undesirably directed beams cannot penetrate this third side wall 7d, or can do so only with great difficulty. In this way, such undesirable beams are prevented from emergence and dazzling the driver is avoided. Advantageously, the light entering by the penetration through the prismatic unit 7a is diverted to a beam within the specified angular zone 8.

Figure 4:
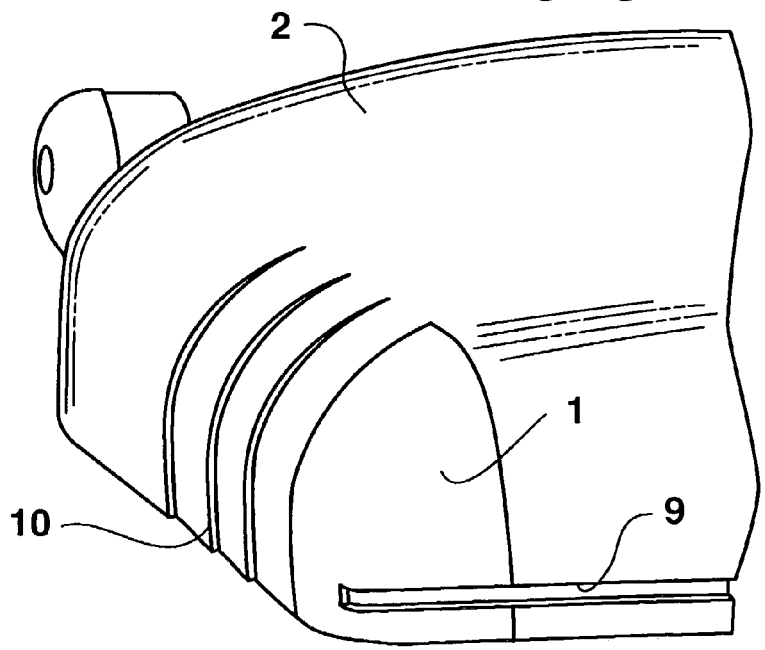
FIG. 4 is a blinker light in accord with another aspect of the invention presented in a perspective view.

Because of the fact that the housing 2 does not function as a light conductor as it does in the case of conventional mirror-blinker lights, which divert the light into the desired radiation direction, the housing 2 can be optionally formed. Especially, it can have something like a vertical water runoff 9 and/or a horizontal drop edge 10 as shown in FIG. 4.

Figure 5:
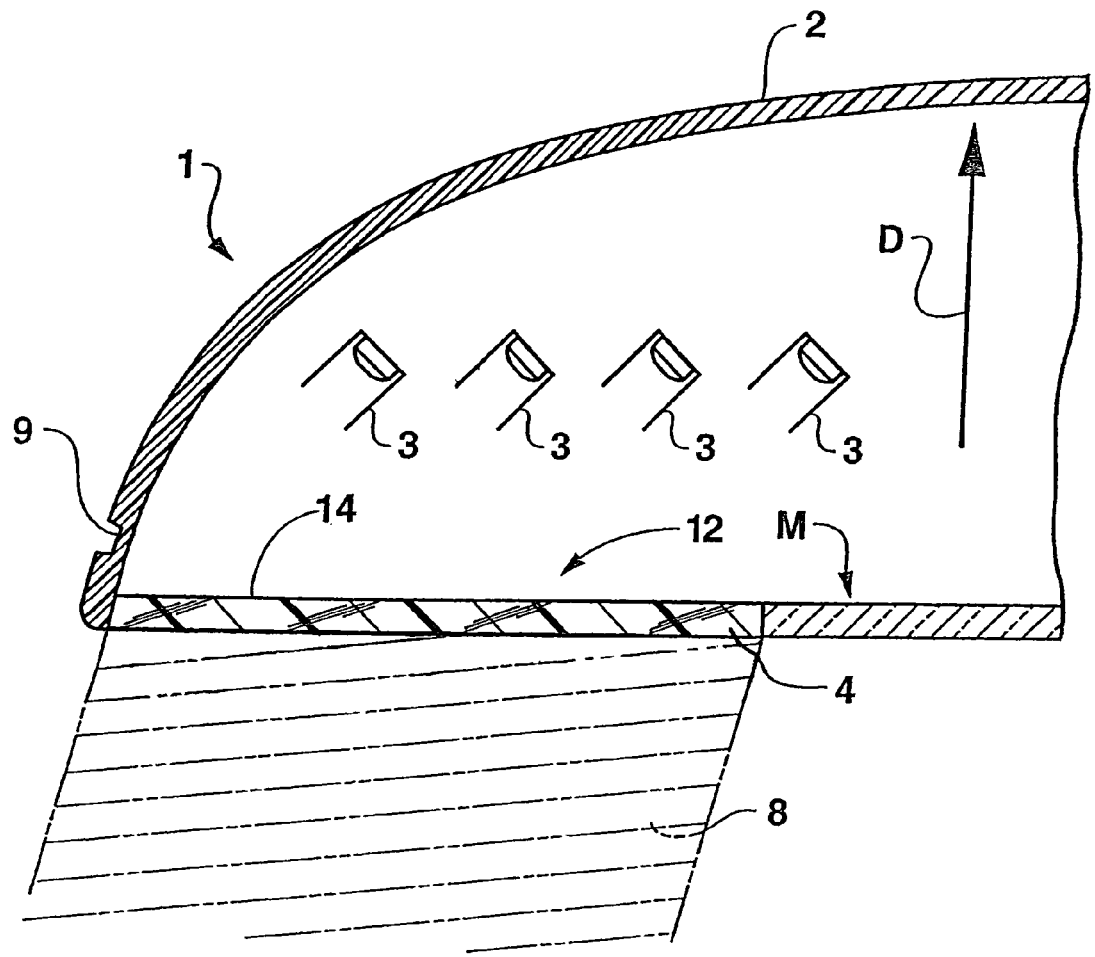
FIG. 5 is a blinker light in accord with a forth embodiment of the present invention, presented in horizontal cross-section.

Referring to FIG. 5, a blinker light in accord with a forth embodiment of the present invention. In this embodiment, the light directive arrangement, indicated generally by reference number 12, is so designed in a holographic manner to provide a holographic light director whereby the light beams from the source of illumination 3 emerge only in one specified angular zone 8 through pane 4. For this purpose, the light directive arrangement 12 includes a holographic optical element 14 carried by pane 4 in order to direct the light beams in a holographic manner from illumination source 3 in specified angular zone 8.

It will be apparent to those skilled in the art that various modifications and variations can be made in the present invention without departing from the scope and spirit of the invention. For example, specific shapes of various elements of the illustrated embodiments may be altered to suit particular applications. It is intended that the present invention include such modifications and variations as come within the scope of the appended claims and their equivalents.

The invention claimed is:

1. A light assembly for a vehicle mirror comprising:
 a housing with an illumination source therein configured to transmit a light beam;
 a pane carried by the housing through which the light is transmitted out of said housing; and
 a light director disposed proximate said pane including a first series of strips carried on a first major surface of said pane and a second series of strips carried on a second of said pane major surface opposite the first major surface, wherein said first series of strips are disposed parallel with and offset from said second series of strips on opposing surfaces of said pane to define openings allowing said light beam to be directed into a specified angular zone.

2. The light assembly as in claim 1, wherein the pane is transparent and adapted to transmit a defined range of wavelengths from said illumination source.

3. The light assembly as in claim 1, wherein the pane includes a transparent part and said strips are imprinted on said pane to provide an opaque part to block light transmission.

4. The light assembly as in claim 1, wherein the illumination source is one of an LED, a fluorescent tube, an incandescent bulb, and combinations thereof operatively associated with a reflector aligned to radiate light from the illumination source in the direction of the specified angular zone.

5. The light assembly as in claim 1 wherein, the specified zone is from about 5 degrees to about 60 degrees relative to a direction of vehicle travel.

6. The light assembly as in claim 1, wherein the illumination source is substantially aligned with the means for directing the light beam such that the light beam emanates along a bisector of a specified zone.

7. The light assembly as in claim 1, wherein the housing defines one of a water drain, a drip edge and combinations thereof.

8. A light assembly for a vehicle mirror comprising:
  a housing with an illumination source therein configured to transmit a light beam;
  a pane carried by said housing through which the light is transmitted out of said housing;
  a light director disposed adjacent the pane including a plurality of opaque slats laterally spaced to provide a plurality of openings for passing light; and,
  said slats including angled surfaces defining said openings for directing light from said illumination source through said pane into a specified angular zone.

9. The light assembly as in claim 8, wherein the specified zone is from about 5 degrees to about 60 degrees relative to a direction of vehicle travel.

10. A light assembly for a vehicle mirror comprising:
  a housing with an illumination source therein configured to transmit a light beam;
  a pane carried by said housing through which the light is transmitted out of said housing; and
  a light director operatively associated with the pane having a prismatically shaped arrangement including an opaque area configured to direct the light beam into a specified angular zone.

11. The light assembly as in claim 10, wherein the light director is formed by the pane.

12. The light assembly as in claim 11, wherein the prismatically shaped arrangement of the light detector includes at least one prismatic unit having a first side generally facing the illumination source inside the housing, a second side disposed outside the housing facing normal to the direction of beam radiation, and a third side adjacent the second side providing the opaque area to prevent light transmission in an undesired direction.

13. The light assembly as in claim 10, wherein the specified zone is from about 5 degrees to about 60 degrees relative to a direction of vehicle travel.

14. A light assembly for a vehicle mirror comprising:
  an opaque mirror housing carrying an illumination source therein configured to transmit a light beam;
  a mirror pane carried by said mirror housing having a reflective coating;
  a transparent pane mounted in said housing adjacent said mirror pane so that said light beam exits said housing through said transparent pane; and
  a holographic light director carried by said transparent pane directing the light beam from the illumination source though said pane and into a specified angular zone.

* * * * *